United States Patent
Yanase et al.

(10) Patent No.: US 8,944,885 B2
(45) Date of Patent: Feb. 3, 2015

(54) DEVICE FOR PHASING THREADED GRINDING WHEEL

(75) Inventors: Yoshikoto Yanase, Ritto (JP); Kazuyuki Ishizu, Ritto (JP); Tomohito Tani, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 393 days.

(21) Appl. No.: 13/498,336

(22) PCT Filed: Sep. 28, 2009

(86) PCT No.: PCT/JP2009/066769
§ 371 (c)(1),
(2), (4) Date: May 23, 2012

(87) PCT Pub. No.: WO2011/036791
PCT Pub. Date: Mar. 31, 2011

(65) Prior Publication Data
US 2012/0225609 A1    Sep. 6, 2012

(51) Int. Cl.
*B24B 49/00* (2012.01)
*B24B 51/00* (2006.01)
(Continued)

(52) U.S. Cl.
CPC ............. *B23F 23/00* (2013.01); *B23F 23/1225* (2013.01); *B24B 49/003* (2013.01); *B24B 49/10* (2013.01); *B24B 53/075* (2013.01)
USPC ...................... 451/9; 451/21; 451/47; 451/72

(58) Field of Classification Search
CPC ...... B24B 49/18; B24B 47/22; B24B 49/003; B24B 49/08; B24B 53/075; B24B 53/083; B24B 53/085; B23F 5/04; G05B 19/182; G05B 2219/37405
USPC ............ 702/182; 451/8, 9, 10, 11, 21, 47, 48, 451/51, 56, 61, 72
See application file for complete search history.

(56) References Cited

U.S. PATENT DOCUMENTS 4,744,348 A * 5/1988 Oda et al. .................... 125/11.03
5,618,993 A * 4/1997 Matsumoto et al. ............ 73/587
(Continued)

FOREIGN PATENT DOCUMENTS

JP    61-260976 A    11/1986
JP    63-186547 U    11/1988
(Continued)

OTHER PUBLICATIONS

Taiwanese Office Action dated Feb. 23, 2012 with English translation.

*Primary Examiner* — Timothy V Eley
(74) *Attorney, Agent, or Firm* — Birch, Stewart, Kolasch & Birch, LLP

(57) ABSTRACT

A device for phasing a threaded grinding stone is phased with respect to a workpiece or a disk dresser prior to the engagement of the threaded grinding stone with the workpiece or with the disk dresser during grinding or dressing. In performing this phasing, it is detected, by means of an AE fluid sensor provided to a grinding stone head which rotatably supports the threaded grinding stone, whether the threaded grinding stone has had contact with the workpiece or the disk dresser. Subsequently, on the basis of the phase of the threaded grinding stone at the time when contact was detected, the threaded grinding stone is positioned in a phase where the aforementioned engagement is feasible.

1 Claim, 6 Drawing Sheets

(51) Int. Cl.
*B23F 23/00* (2006.01)
*B23F 23/12* (2006.01)
*B24B 49/10* (2006.01)
*B24B 53/075* (2006.01)

(56) References Cited

U.S. PATENT DOCUMENTS

| | | | |
|---|---|---|---|
| 5,957,752 A * | 9/1999 | Katakura | 451/10 |
| 7,066,028 B2 * | 6/2006 | Dondi | 73/649 |
| 2006/0014474 A1 | 1/2006 | Yanase et al. | |

FOREIGN PATENT DOCUMENTS

| | | |
|---|---|---|
| JP | 2-7957 U | 1/1990 |
| JP | 4-176542 A | 6/1992 |
| JP | 5-138438 A | 6/1993 |
| JP | 7-190850 A | 7/1995 |
| JP | 9-174330 A | 7/1997 |
| JP | 2000-326141 A | 11/2000 |
| JP | 2003-130627 A | 5/2003 |
| JP | 2003-165023 A | 6/2003 |
| JP | 2004-17253 A | 1/2004 |
| JP | 2006-26789 A | 2/2006 |

* cited by examiner

DEVICE FOR PHASING THREADED GRINDING WHEEL

TECHNICAL FIELD

The present invention relates to a phasing device for a threaded grinding wheel used to phase a threaded grinding wheel with a gear to be machined or a dresser ahead of the meshing of the threaded grinding wheel with the gear or the dresser at the time of grinding or dressing.

BACKGROUND ART

Heretofore, gear grinding machines are provided to efficiently finish the tooth surfaces of a workpiece, which is a heat-treated gear to be machined, by grinding the workpiece with a grinding wheel, which is a grinding tool. In such a gear grinding machine, the workpiece is ground in a state in which the grinding wheel and the workpiece are being rotated in synchronization while meshing with each other. Accordingly, insufficient precision of meshing may cause uneven grinding on the tooth surfaces of the workpiece and may reduce the life of the grinding wheel due to an excessive load thereon.

For the above-described reasons, in a gear grinding machine of this type, phasing is performed ahead of meshing at the time of grinding in order to mesh a grinding wheel with a workpiece with high precision. In the phasing, the grinding wheel and the workpiece are positioned so that the cutting edges (peaks and valleys) of the grinding wheel and the roots (peaks and valleys) of the teeth of the workpiece have an appropriate phase relationship. Such a phasing device for phasing a grinding wheel with a workpiece is disclosed in, for example, Patent Literature 1.

PRIOR ART DOCUMENT

Patent Document

Patent Document 1: Japanese Patent Application Publication No. Hei 5-38438

SUMMARY OF THE INVENTION

Problem to be Solved by the Invention

In the above-described conventional phasing device, a grinding wheel is slid on a workpiece in the axial direction thereof, and an AE sensor detects the instant of occurrence of contact and the instant of loss of contact when the grinding wheel crosses a thread groove of the workpiece. The workpiece is moved in the axial direction thereof so that the grinding wheel faces an intermediate position in the thread groove which is found based on the results of the detection. In this way, the grinding wheel and the workpiece are phased with each other.

However, in such a conventional configuration, the contact and non-contact of the grinding wheel with the workpiece is determined by the AE sensor detecting the vibration of the workpiece at the time of contact. Accordingly, in a gear grinding machine in which the grinding wheel can be dressed, another AE sensor is needed to phase the grinding wheel with a dresser. This may complicate the configuration of the machine.

Accordingly, the present invention has been made to solve the above-described problems, and an object of the present invention is to provide a phasing device for a threaded grinding wheel which can, with a simple configuration, precisely phase a threaded grinding wheel with a gear to be machined or a dresser.

Means for Solving the Problems

A phasing device for a threaded grinding wheel according to a first aspect of the invention to solve the above problem is a phasing device being used to phase the threaded grinding wheel with any one of a gear to be machined and a dresser ahead of meshing of the threaded grinding wheel with the one of the gear and the dresser at the time of a corresponding one of grinding and dressing processes, the phasing device characterized by comprising: detection means for detecting whether or not the threaded grinding wheel has come into contact with the one of the gear and the dresser, the detection means being provided on a grinding wheel head by which the threaded grinding wheel is rotatably supported; and grinding wheel phase control means for positioning the threaded grinding wheel so that the threaded grinding wheel has a phase which allows meshing, based on a phase of the threaded grinding wheel when the detection means detects the contact.

A phasing device for a threaded grinding wheel according to a second aspect of the invention to solve the above problem is characterized in that the detection means is an acoustic emission fluid sensor which detects elastic waves generated in the threaded grinding wheel due to vibration or friction through fluid jetted to the vicinity of the threaded grinding wheel, and based on the detected elastic waves, a determination is made whether or not the threaded grinding wheel has come into contact with the one of the gear (W) and the dresser.

A phasing device for a threaded grinding wheel according to a third aspect of the invention to solve the above problem is characterized in that the fluid sensor jets the fluid from a direction shifted in phase by 90 degrees in a circumferential direction of the threaded grinding wheel from a contact point between the threaded grinding wheel and the one of the gear and the dresser.

Effect of the Invention

In the phasing device for a threaded grinding wheel according to the present invention, detection means provided on a grinding wheel head by which a threaded grinding wheel is rotatably supported detects whether or not a threaded grinding wheel has come into contact with a gear to be machined or a dresser. In this way, with a simple configuration, the threaded grinding wheel can be precisely phased with the gear to be machined or the dresser.

MODE FOR CARRYING OUT THE INVENTION

Hereinafter, a phasing device for a threaded grinding wheel according to the present invention will be described in detail with reference to the drawings.
Embodiment A gear grinding machine 1 to which the phasing device for a threaded grinding wheel according to the present invention is applied is used to grind a workpiece (gear to be machined) W as a material of an internal gear with a barrel-shaped threaded grinding wheel 14 as shown in FIG. 2. Further, the gear grinding machine 1 has the dressing function of dressing the threaded grinding wheel 14 with a disc dresser 32 as shown in FIG. 1.

Figure 1:
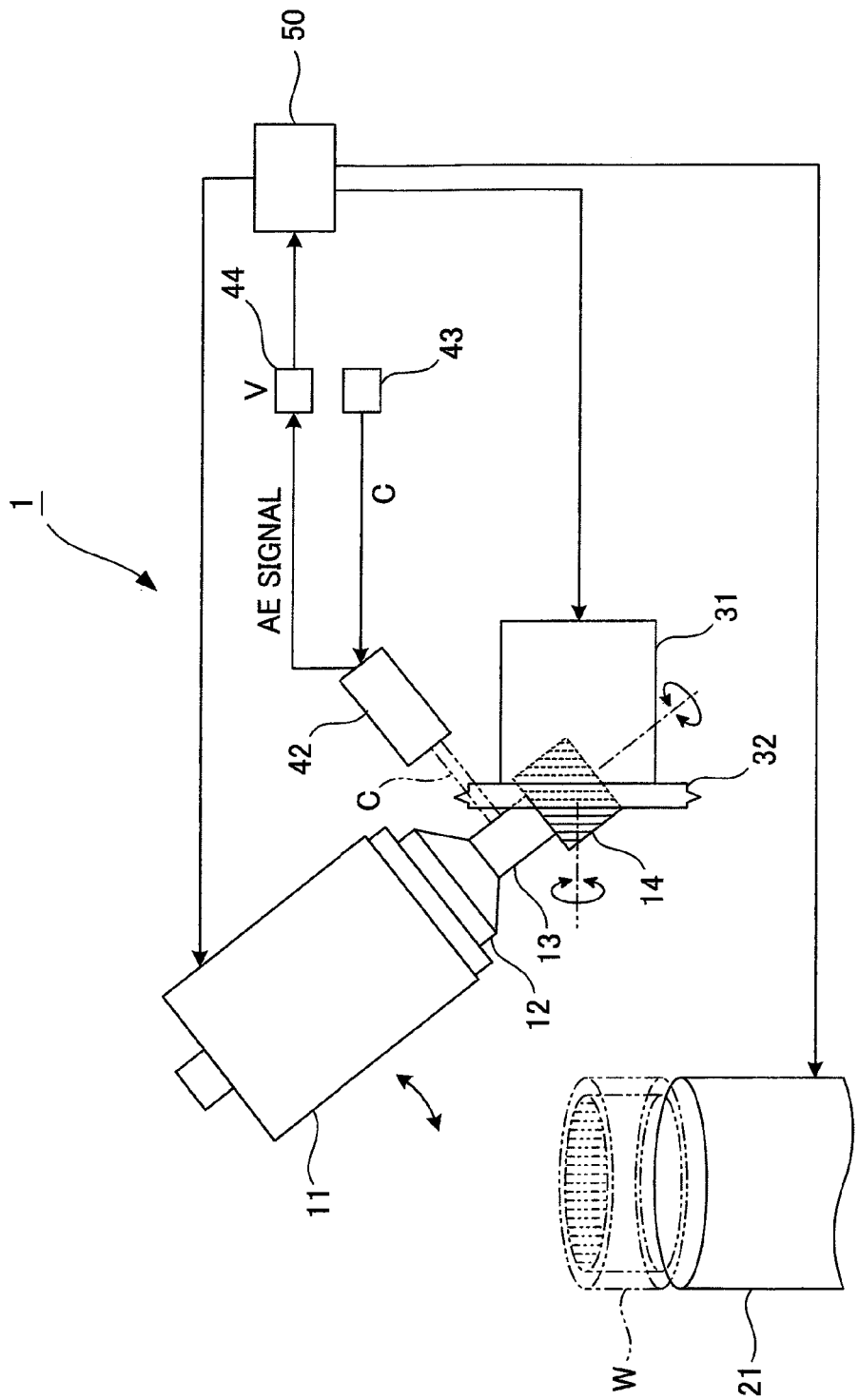
FIG. 1 is a schematic diagram showing the configuration of a phasing device for a threaded grinding wheel according to one example of the present invention, and shows a disc dresser which is dressing a threaded grinding wheel.
Figure 2:
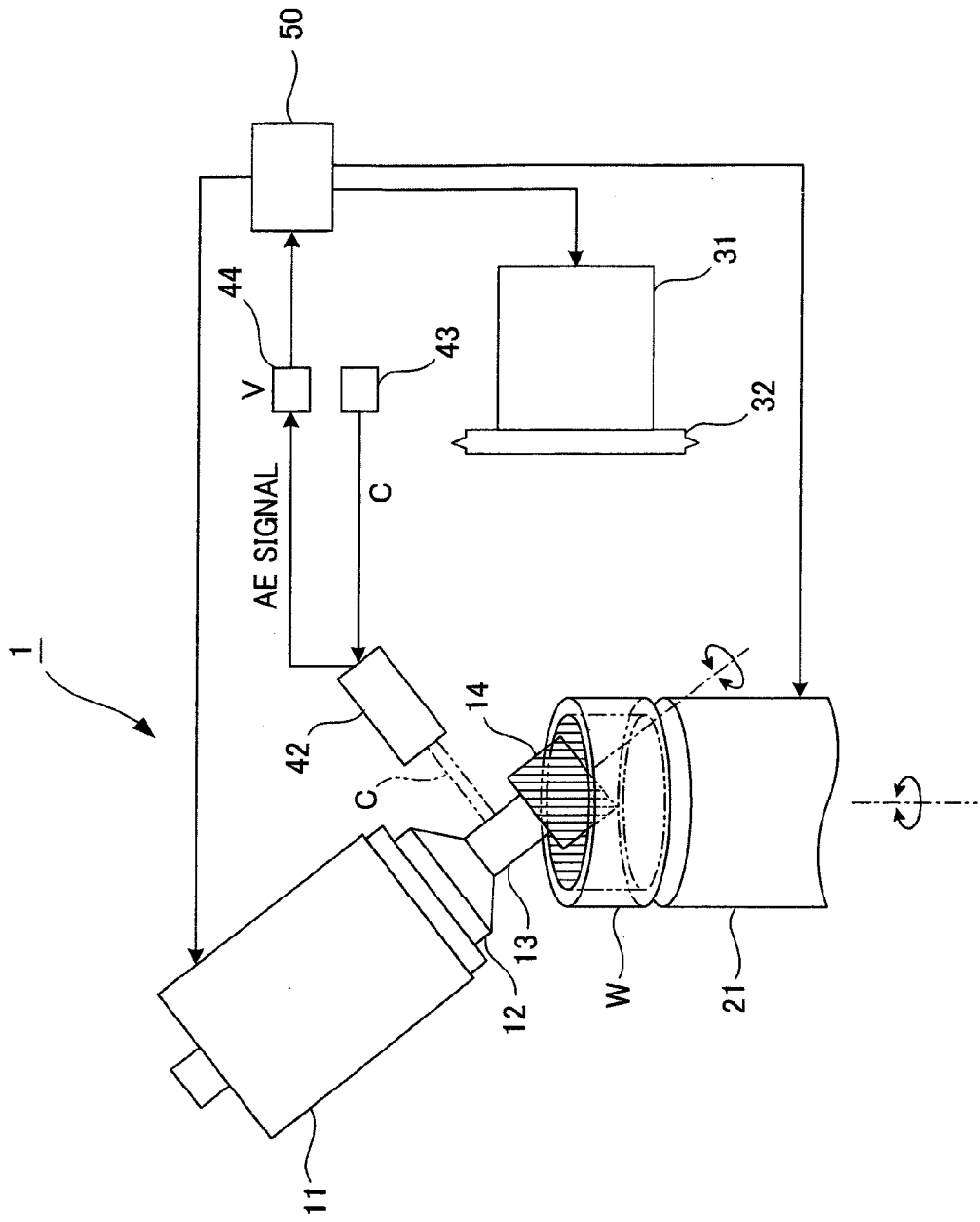
FIG. 2 is a view showing the threaded grinding wheel which is grinding the workpiece.
Figure 3:
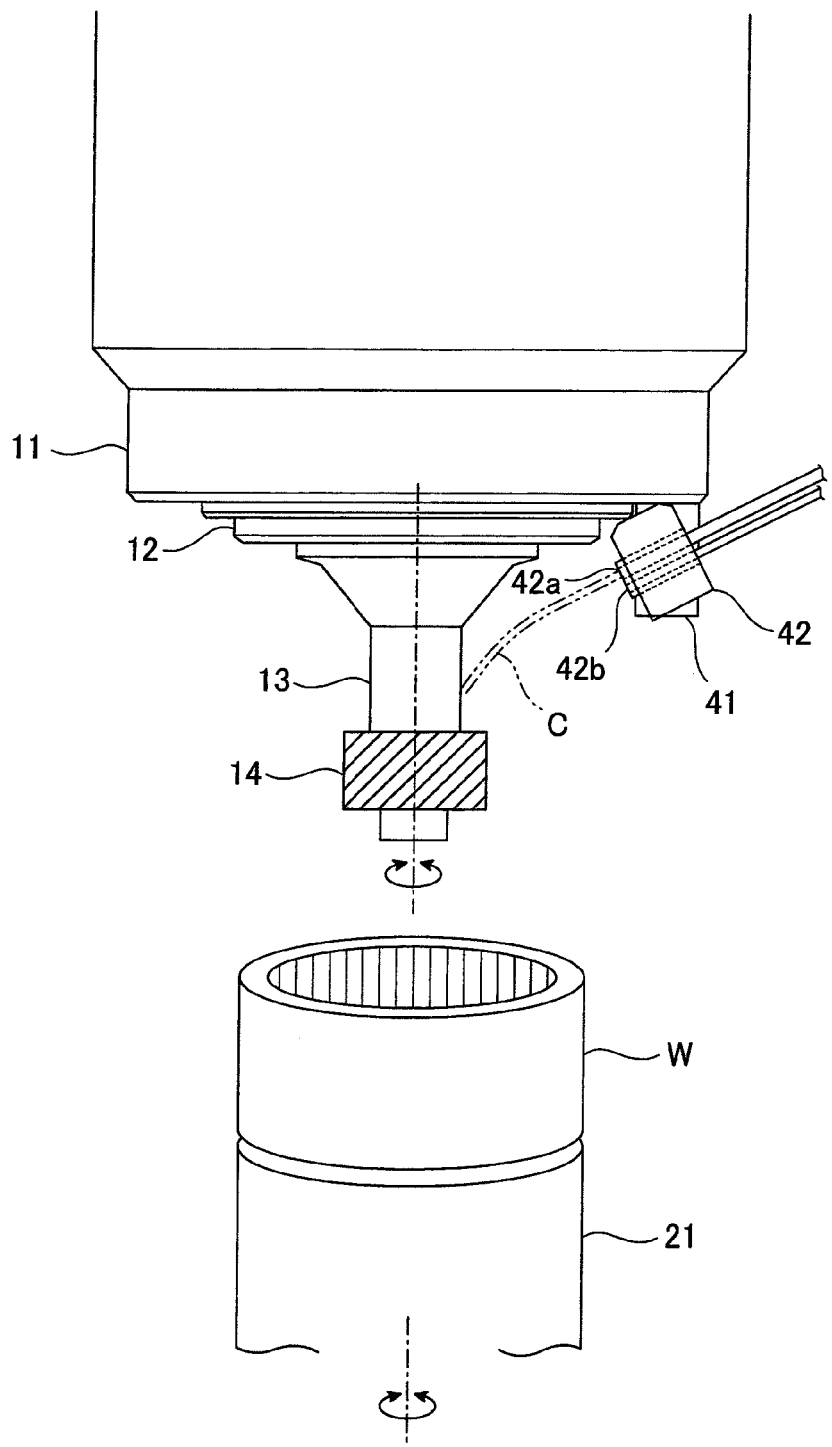
FIG. 3 is a view showing a mounting structure of an AE fluid sensor.

As shown in FIGS. 1 to 3, a grinding wheel head 11 is movably and turnably supported in the gear grinding machine 1. A spindle 12 is rotatably supported by this grinding wheel head 11. At the tip of this spindle 12, a grinding wheel arbor 13 is formed. Further, to the tip of the grinding wheel arbor 13, the threaded grinding wheel 14 is removably attached. Thus, driving the grinding wheel head 11 causes the threaded grinding wheel 14 to be rotationally driven through the grinding wheel arbor 13 of the spindle 12.

In front of the grinding wheel head 11, a rotary table 21 is rotatably supported. To an upper surface of this rotary table 21, the workpiece W is removably attached through an unillustrated installation jig. Thus, driving the rotary table 21 causes the workpiece W to be rotationally driven.

At a side of the rotary table 21, a dresser drive unit 31 is movably supported. To this dresser drive unit 31, the disc dresser 32 is rotatably and removably attached. Thus, driving the dresser drive unit 31 causes the disc dresser 32 to be rotationally driven.

On the tip surface of the grinding wheel head 11, an AE (Acoustic Emission) fluid sensor (detection means, fluid sensor) 42 of an acoustic emission type is supported through a bracket 41. This AE fluid sensor 42 is configured to detect, through jetted fluid, elastic waves generated in a material due to vibration, friction, and the like, and to process the elastic waves as an AE signal. The AE fluid sensor 42 has a jet orifice 42*a* for jetting coolant C as the fluid to a predetermined measurement point on the grinding wheel arbor 13 and a detection unit 42*b* for detecting elastic waves propagating through the coolant C from the measurement point. Furthermore, the jet orifice 42*a* of the AE fluid sensor 42 has a coolant tank 43 connected thereto, and the detection unit 42*b* has an AE sensor amplifier 44 connected thereto.

Figure 4:
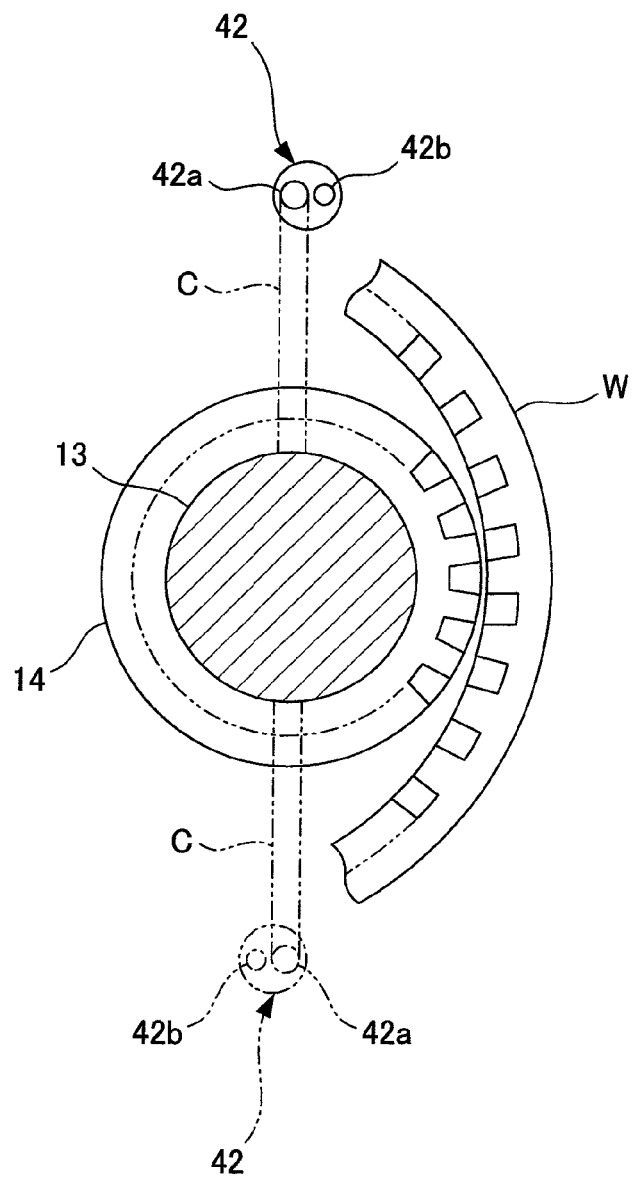
FIG. 4 is a view showing the location of the AE fluid sensor with respect to the threaded grinding wheel at the time of grinding.

It should be noted that as shown in FIG. 4, at the time of phasing the threaded grinding wheel 12 with the workpiece W ahead of grinding, the AE fluid sensor 42 is located at a position shifted in phase by 90 degrees in the circumferential direction of the threaded grinding wheel 14 from a contact point between the threaded grinding wheel 14 and the workpiece W. In this state, the AE fluid sensor 42 jets the coolant C toward the measurement point on the grinding wheel arbor 13. In other words, the AE fluid sensor 42 at the time of phasing the threaded grinding wheel 14 with the workpiece W jets the coolant C from a direction shifted in phase by 90 degrees in the circumferential direction of the threaded grinding wheel 14 from the contact point between the threaded grinding wheel 14 and the workpiece W toward the measurement point on the grinding wheel arbor 13. Further, deciding in which direction to move the location of the AE fluid sensor 42 according to whether the workpiece W is right-hand helical or left-hand helical prevents the AE fluid sensor 42 from interfering with the workpiece W when the grinding wheel head 11 (the threaded grinding wheel 14) turns and tilts in a situation where the threaded grinding wheel 14 and the workpiece W mesh with each other.

Figure 5:
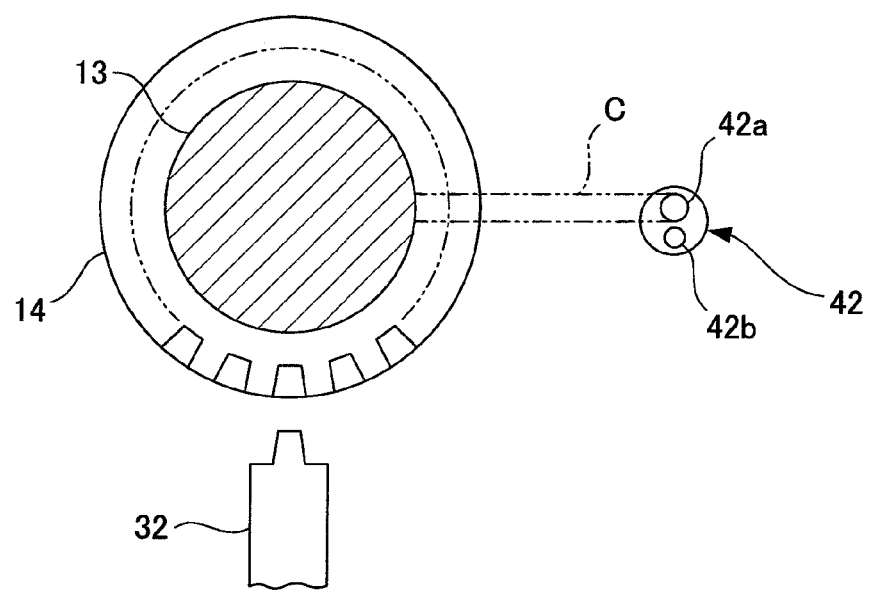
FIG. 5 is a view showing the location of the AE fluid sensor with respect to the threaded grinding wheel at the time of dressing.

Moreover, as shown in FIG. 5, at the time of phasing the threaded grinding wheel 12 with the disc dresser 32 ahead of dressing, the AE fluid sensor 42 is located at a position shifted in phase by 90 degrees in the circumferential direction of the threaded grinding wheel 14 from the contact point between the threaded grinding wheel 14 and the disc dresser 32. In this state, the AE fluid sensor 42 jets the coolant C toward the measurement point on the grinding wheel arbor 13. In other words, the AE fluid sensor 42 at the time of phasing the threaded grinding wheel 12 with the dresser 32 jets the coolant C from a direction shifted in phase by 90 degrees in the circumferential direction of the threaded grinding wheel 14 from the contact point between the threaded grinding wheel 14 and the disc dresser 32 toward the measurement point on the grinding wheel arbor 13.

Further, the coolant C supplied from the coolant tank 43 to the AE fluid sensor 42 is, for example, grinding oil. The pressure and flow rate of the jetted coolant C can be adjusted in accordance with the distance between the AE fluid sensor 42 and the measurement point.

Specifically, in the AE fluid sensor 42, elastic waves generated in the threaded grinding wheel 14 by jetting the coolant C supplied from the coolant tank 43 from the jet orifice 42*a* to the measurement point on the grinding wheel arbor 13 are detected by the detection unit 42*b* through the coolant C, and these detected elastic waves are then inputted as an AE signal to the AE sensor amplifier 44. In the AE sensor amplifier 44, as shown in FIG. 6, the inputted AE signal is converted into voltage V, and this voltage V is displayed as needed.

Moreover, in the gear grinding machine 1, an NC (numerical control) unit (grinding wheel phase control means) 50 is provided. This NC unit 50 is connected to, for example, the grinding wheel head 11, the rotary table 21, the dresser drive unit 31, the AE sensor amplifier 44, and the like. The NC unit 50 controls the grinding of the workpiece W with the threaded grinding wheel 14 and the dressing of the threaded grinding wheel 14 with the disc dresser 32 based on inputted workpiece specifications and machining conditions. Ahead of meshing (gear meshing operation) at the time of the above-described grinding or dressing, the NC unit 50 determines whether or not there is a contact between the threaded grinding wheel 14 and the workpiece W or the disc dresser 32, based on the amplitude of elastic waves detected by acoustic emission fluid sensor 44, thus phasing the threaded grinding wheel 14.

The grinding of the workpiece W with the threaded grinding wheel 14 starts with moving the threaded grinding wheel 14 to the side of the workpiece W attached to the rotary table 21 as shown in FIG. 2. It is desirable that, after that, the phasing between the threaded grinding wheel 14 and the workpiece W be roughly performed (rough phasing) before the threaded grinding wheel 14 and the workpiece W are meshed with each other so that the thread tips of the threaded grinding wheel 14 and the tooth tips of the workpiece W do not interfere with each other. In such a roughly phase-matched state, the threaded grinding wheel 14 and the workpiece W are rotated in synchronization, and the coolant C is jetted from the jet orifice 42*a* of the AE fluid sensor 42 toward the measurement point on the grinding wheel arbor 13. Then, the detection of elastic waves generated in the threaded grinding wheel 14 is started by the detection unit 42b of the AE fluid sensor 42.

Figure 6:
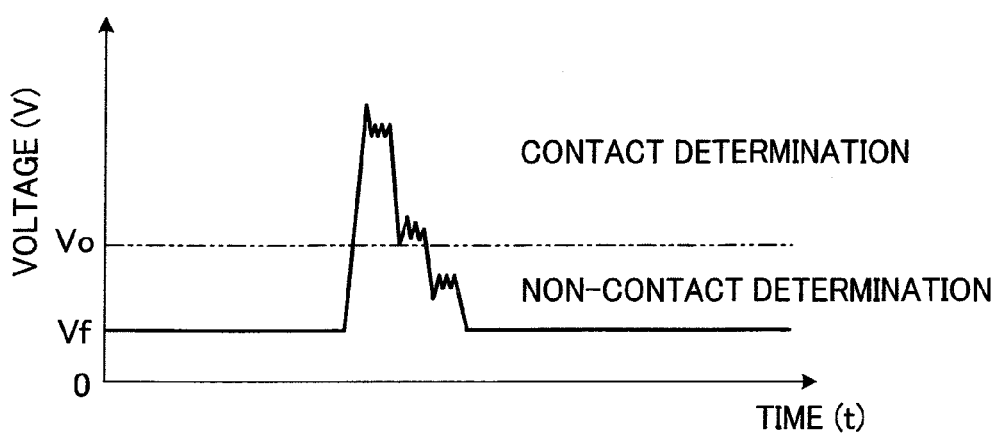
FIG. 6 is a view showing the change of voltage when the AE fluid sensor detects elastic waves generated in the threaded grinding wheel.

When the detection of elastic waves by the AE fluid sensor 42 is started as described above, the AE sensor amplifier 44 converts the inputted AE signal into the voltage V to display the change thereof with time as shown in FIG. 6. It should be noted that at the same time as the detection of elastic waves by the AE fluid sensor 42 is started, the voltage V is measured as the maximum voltage Vf of the threaded grinding wheel 14 in non-contact conditions, and a threshold value Vo larger than this voltage Vf is automatically set. This threshold value Vo is used when an undermentioned contact determination is made on the threaded grinding wheel 14.

Subsequently, only the rotation speed (number of rotations) of the workpiece W is increased to cause a loss of synchronization between the threaded grinding wheel 14 and the workpiece W. Thus, one tooth surfaces of the workpiece W are brought into contact with one thread surfaces of the threaded grinding wheel 14. As a result, elastic waves generated in the threaded grinding wheel 14 due to the contact are propagated to the grinding wheel arbor 13. These elastic waves propagated to the grinding wheel arbor 13 are detected by the AE fluid sensor 42 through the coolant C. At this time, as shown in FIG. 6, in the AE sensor amplifier 44, the waveform of the voltage V changes in accordance with the inputted AE signal. When this voltage V (Vf) exceeds the predetermined threshold value Vo, the NC unit 50 determines that the workpiece W has come into contact with the threaded grinding wheel 14, and stores the phase of the threaded grinding wheel 14 of this time.

Then, only the rotation speed (number of rotations) of the workpiece W is decreased to cause a loss of synchronization between the threaded grinding wheel 14 and the workpiece W. Thus, the other tooth surfaces of the workpiece W are brought into contact with the other thread surfaces of the threaded grinding wheel 14. As a result, elastic waves generated in the threaded grinding wheel 14 due to the contact are propagated to the grinding wheel arbor 13. These elastic waves propagated to the grinding wheel arbor 13 are detected by the AE fluid sensor 42 through the coolant C. At this time, as shown in FIG. 6, in the AE sensor amplifier 44, the waveform of the voltage V changes in accordance with the inputted AE signal. When this voltage V (Vf) exceeds the predetermined threshold value Vo, the NC unit 50 determines that the workpiece W has come into contact with the threaded grinding wheel 14, and stores the phase of the threaded grinding wheel 14 of this time.

Then, the NC unit 50 finds an intermediate phase from the two stored phases of the threaded grinding wheel 14. The intermediate phase is intermediate between the two stored phases. After that, phasing is performed precisely (precise phasing) by positioning the threaded grinding wheel 14 so that the phase thereof is the intermediate phase. Subsequently, in such a precisely phase-matched state, the threaded grinding wheel 14 is meshed with the workpiece W, and the threaded grinding wheel 14 and the workpiece W are rotated in synchronization. As a result, the tooth surfaces of the workpiece W are ground by the thread surfaces of the threaded grinding wheel 14.

What should be noted here is that the use of the threaded grinding wheel 14 to grind a certain number of workpieces W causes a decrease in sharpness of the threaded grinding wheel 14 due to the wear of the thread surfaces thereof. To address this decrease, the dressing of the threaded grinding wheel 14 needs to be carried out on a regular basis with the disc dresser 32.

The dressing of the threaded grinding wheel 14 with the disc dresser 32 starts with moving the threaded grinding wheel 14 to the disc dresser 32 side as shown in FIG. 1. It is desirable that, after that, the phasing between the threaded grinding wheel 14 and the disc dresser 32 be roughly performed (rough phasing) before the threaded grinding wheel 14 and the disc dresser 32 are meshed with each other so that the thread tips of the threaded grinding wheel 14 and the blade edge of the disc dresser 32 do not interfere with each other. Subsequently, in such a roughly phase-matched state, the disc dresser 32 is rotated while the rotation of the threaded grinding wheel 14 is kept stopped, and the coolant C is jetted from the jet orifice 42a of the AE fluid sensor 42 toward the measurement point on the grinding wheel arbor 13. Then, the detection of elastic waves generated in the threaded grinding wheel 14 is started by the detection unit 42b of the AE fluid sensor 42.

When the detection of elastic waves by the AE fluid sensor 42 is started as described above, the AE sensor amplifier 44 converts the inputted AE signal into the voltage V to display the change thereof with time as shown in FIG. 6. It should be noted that at the same time as the detection of elastic waves by the AE fluid sensor 42 is started, the voltage V is measured as the maximum voltage Vf of the threaded grinding wheel 14 in non-contact conditions, and a threshold value Vo larger than this voltage Vf is automatically set. This threshold value Vo is used when an undermentioned contact determination is made on the threaded grinding wheel 14.

Then, the threaded grinding wheel 14 is rotated forward so that one thread surfaces thereof are brought into contact with one blade surface of the disc dresser 32. As a result, elastic waves generated in the threaded grinding wheel 14 due to the contact are propagated to the grinding wheel arbor 13. These elastic waves propagated to the grinding wheel arbor 13 are detected by the AE fluid sensor 42 through the coolant C. At this time, as shown in FIG. 6, in the AE sensor amplifier 44, the waveform of the voltage V changes in accordance with the inputted AE signal. When this voltage V (Vf) exceeds the predetermined threshold value Vo, the NC unit 50 determines that the threaded grinding wheel 14 has come into contact with the disc dresser 32, and stores the phase of the threaded grinding wheel 14 of this time.

Subsequently, the threaded grinding wheel 14 is rotated reversely so that the other thread surfaces thereof are brought into contact with the other blade surface of the disc dresser 32. As a result, elastic waves generated in the threaded grinding wheel 14 due to the contact are propagated to the grinding wheel arbor 13. These elastic waves propagated to the grinding wheel arbor 13 are detected by the AE fluid sensor 42 through the coolant C. At this time, as shown in FIG. 6, in the AE sensor amplifier 44, the waveform of the voltage V changes in accordance with the inputted AE signal. When this voltage V (Vf) exceeds the predetermined threshold value Vo, the NC unit 50 determines that the threaded grinding wheel 14 has come into contact with the disc dresser 32, and stores the phase of the threaded grinding wheel 14 of this time.

Then, the NC unit 50 finds an intermediate phase from the two stored phases of the threaded grinding wheel 14. The intermediate phase is intermediate between the two stored phases. After that, phasing is performed precisely (precise phasing) by positioning the threaded grinding wheel 14 so that the phase thereof is the intermediate phase. Subsequently, in such a precisely phase-matched state, the threaded grinding wheel 14 is meshed with the disc dresser 32, and the disc dresser 32 is rotated. As a result, the thread surfaces of the threaded grinding wheel 14 are dressed by the blade surfaces of the disc dresser 32.

It should be noted that though the workpiece W as a material of an internal gear has been employed in this example, a workpiece as a material of an external gear may be employed. Moreover, though the common threshold voltage Vo has been used in a contact determination between the threaded grinding wheel 14 and the workpiece W or the disc dresser 32, different threshold values may be used. With respect to these threshold values, different values can be set for different materials, different machining conditions, and the like.

Accordingly, in the phasing device for a threaded grinding wheel according to the present invention, when the threaded grinding wheel 14 is phased with the workpiece W or the disc dresser 32 ahead of the meshing of the threaded grinding wheel 14 with the workpiece W or the disc dresser 32 at the time of grinding or dressing, the AE fluid sensor 42 provided on the grinding wheel head 11 by which the threaded grinding wheel 14 is rotatably supported detects whether or not the threaded grinding wheel 14 has come into contact with the workpiece W or the disc dresser 32. Based on the phase of the threaded grinding wheel 14 when the contact is detected, the threaded grinding wheel 14 is positioned to have a phase which allows the meshing. Thus, with a simple configuration, the threaded grinding wheel 14 can be precisely phased with the workpiece W or the disc dresser 32.

Industrial Applicability

The present invention can be applied to a gear grinding machine which enables a reduction of non-machining time.

The invention claimed is:

1. A phasing device for a threaded grinding wheel, the phasing device phasing the threaded grinding wheel with a gear to be machined ahead of meshing of the threaded grinding wheel with the gear at the time of a grinding process, the phasing device comprising:

detection means for detecting whether or not the threaded grinding wheel has come into contact with the gear, the detection means being provided on a grinding wheel head by which the threaded grinding wheel is rotatably supported; and grinding wheel phase control means for positioning the threaded grinding wheel so that the threaded grinding wheel has a phase which allows meshing, based on a phase of the threaded grinding wheel when the detection means detects the contact, wherein the detection means is an acoustic emission fluid sensor which detects elastic waves generated in the threaded grinding wheel due to vibration or friction through fluid jetted to the vicinity of the threaded grinding wheel, the detection means is located at any of positions shifted in phase by 90 degrees in a circumferential direction of the threaded grinding wheel from a contact position between the threaded grinding wheel and the gear, according to whether the gear is right-hand helical or left-hand helical, and based on the detected elastic waves, the detection means determines whether or not the threaded grinding wheel has come into contact with the gear.

* * * * *